(12) United States Patent
Rajesh et al.

(10) Patent No.: US 9,904,944 B2
(45) Date of Patent: Feb. 27, 2018

(54) SYSTEM AND METHOD FOR DOMAIN NAME QUERY METRICS

(71) Applicant: Go Daddy Operating Company, LLC, Scottsdale, AZ (US)

(72) Inventors: Gomathi Rajesh, Phoenix, AZ (US); Karen Trueblood Munoz, Scottsdale, AZ (US); Rajesh Venkataraman, Phoenix, AZ (US)

(73) Assignee: Go Daddy Operating Company, LLC., Scottsdale, AZ (US)

( * ) Notice: Subject to any disclaimer, the term of this patent is extended or adjusted under 35 U.S.C. 154(b) by 684 days.

(21) Appl. No.: 13/969,016

(22) Filed: Aug. 16, 2013

(65) Prior Publication Data
US 2015/0051996 A1 Feb. 19, 2015

(51) Int. Cl.
G06Q 30/00 (2012.01)
G06Q 30/06 (2012.01)
G06F 17/30 (2006.01)

(52) U.S. Cl.
CPC ... *G06Q 30/0601* (2013.01); *G06F 17/30477* (2013.01); *G06Q 30/0621* (2013.01)

(58) Field of Classification Search
CPC .... G06C 30/00; G06C 30/08; G06C 30/0601; G06C 30/0613; G06C 30/0619
See application file for complete search history.

(56) References Cited

U.S. PATENT DOCUMENTS

| | | |
|---|---|---|
| 6,332,158 B1 | 12/2001 | Risley et al. |
| 6,338,082 B1 | 1/2002 | Schneider |
| 6,745,248 B1 | 6/2004 | Gardos et al. |
| 6,760,746 B1 | 7/2004 | Schneider |
| 6,876,997 B1 | 4/2005 | Rorex et al. |
| 6,895,430 B1 | 5/2005 | Schneider |
| 6,901,436 B1 | 5/2005 | Schneider |
| 6,973,505 B1 | 12/2005 | Schneider |
| 6,980,990 B2 | 12/2005 | Fellman |
| 7,000,028 B1 | 2/2006 | Broadhurst et al. |

(Continued)

FOREIGN PATENT DOCUMENTS

| | | |
|---|---|---|
| JP | 2002297938 | 10/2002 |
| WO | 9909726 | 2/1999 |

OTHER PUBLICATIONS

Cox, Russ, Athicha Muthitacharoen, and Robert T. Morris. "Serving DNS using a peer-to-peer lookup service." International Workshop on Peer-To-Peer Systems. Springer, Berlin, Heidelberg, 2002.*

(Continued)

*Primary Examiner* — Michael Misiaszek
*Assistant Examiner* — Christopher Seibert
(74) *Attorney, Agent, or Firm* — Quarles & Brady LLP

(57) ABSTRACT

A system and method for providing users an assessment tool for determining the level of demand for domain names. The assessment tool is configured to receive, by a server communicatively coupled to a network, a request from a requester. The request is used to identify a domain name and determine whether the domain name is registered. When the domain name is not registered, a search metric for the domain name is determined and a first user interface listing the domain name and the search metric is displayed. The first user interface enables the requester to purchase the domain name.

8 Claims, 5 Drawing Sheets

(56) References Cited

U.S. PATENT DOCUMENTS

| | | | |
|---|---|---|---|
| 7,039,697 | B2 | 5/2006 | Bayles |
| 7,188,138 | B1 | 3/2007 | Schneider |
| 7,194,552 | B1 | 3/2007 | Schneider |
| 7,299,299 | B2 | 11/2007 | Hollenbeck et al. |
| 7,305,394 | B2 | 12/2007 | Fellman |
| 7,418,471 | B2 | 8/2008 | King et al. |
| 7,565,630 | B1 | 7/2009 | Kamvar et al. |
| 7,606,858 | B2 | 10/2009 | King et al. |
| 7,627,628 | B2 | 12/2009 | King et al. |
| 7,664,831 | B2 | 2/2010 | Cartmell et al. |
| 7,689,458 | B2 | 3/2010 | Heckerman et al. |
| 7,702,902 | B2 | 4/2010 | Thayer et al. |
| 7,814,141 | B2 | 10/2010 | Parsons et al. |
| 7,870,213 | B2 | 1/2011 | Parsons et al. |
| 7,870,214 | B2 | 1/2011 | Parsons et al. |
| 7,890,602 | B1 | 2/2011 | Parsons et al. |
| 7,937,446 | B2 | 5/2011 | Rechterman et al. |
| 7,996,457 | B2 | 8/2011 | Parsons et al. |
| 8,037,168 | B2 | 10/2011 | Schneider |
| 8,276,057 | B2 | 9/2012 | Rowe et al. |
| 8,301,743 | B2 | 10/2012 | Curran et al. |
| 2002/0002552 | A1 | 1/2002 | Schultz et al. |
| 2002/0065903 | A1 | 5/2002 | Fellman |
| 2002/0091703 | A1 | 7/2002 | Bayles |
| 2002/0091827 | A1 | 7/2002 | King et al. |
| 2002/0120537 | A1 | 8/2002 | Morea et al. |
| 2002/0194373 | A1 | 12/2002 | Choudhry |
| 2003/0149690 | A1 | 8/2003 | Kudlacik et al. |
| 2003/0225670 | A1* | 12/2003 | DeCarlo, III .......... G06Q 30/08 705/37 |
| 2004/0162916 | A1 | 8/2004 | Ryan |
| 2004/0167982 | A1 | 8/2004 | Cohen et al. |
| 2004/0199493 | A1 | 8/2004 | Ruiz et al. |
| 2004/0172463 | A1 | 9/2004 | King et al. |
| 2004/0199520 | A1* | 10/2004 | Ruiz ................. H04L 29/12594 |
| 2004/0199608 | A1 | 10/2004 | Rechterman et al. |
| 2005/0114484 | A1 | 5/2005 | Wilson et al. |
| 2005/0125451 | A1 | 6/2005 | Mooney |
| 2005/0203891 | A1 | 9/2005 | Broadhurst et al. |
| 2005/0216288 | A1 | 9/2005 | Parsons et al. |
| 2005/0234921 | A1 | 10/2005 | King et al. |
| 2005/0256853 | A1 | 11/2005 | Fellman |
| 2006/0004784 | A1 | 1/2006 | Abelman |
| 2006/0101155 | A1 | 5/2006 | Damour et al. |
| 2006/0106793 | A1 | 5/2006 | Liang |
| 2006/0161682 | A1 | 7/2006 | King et al. |
| 2006/0168020 | A1 | 7/2006 | Brennan, III |
| 2006/0230380 | A1 | 10/2006 | Holmes et al. |
| 2006/0271668 | A1 | 11/2006 | Parsons et al. |
| 2007/0180056 | A1 | 8/2007 | Assad |
| 2007/0198495 | A1 | 8/2007 | Buron et al. |
| 2007/0208869 | A1 | 9/2007 | Adelman et al. |
| 2007/0271393 | A1 | 11/2007 | Wong |
| 2007/0299815 | A1 | 12/2007 | Starbuck et al. |
| 2008/0005127 | A1 | 1/2008 | Schneider |
| 2008/0040329 | A1 | 2/2008 | Cussen et al. |
| 2008/0071909 | A1 | 3/2008 | Young et al. |
| 2008/0222125 | A1 | 9/2008 | Chowdhury |
| 2008/0270418 | A1 | 10/2008 | Chen et al. |
| 2009/0006351 | A1 | 1/2009 | Stephenson et al. |
| 2009/0031028 | A1* | 1/2009 | Kumar ................ H04L 12/4641 709/227 |
| 2009/0241066 | A1 | 9/2009 | Costello |
| 2009/0292696 | A1 | 11/2009 | Shuster |
| 2010/0070448 | A1 | 3/2010 | Omoigui |
| 2010/0106793 | A1 | 4/2010 | Parsons et al. |
| 2011/0178865 | A1* | 7/2011 | Ravichandran ........ G06Q 10/06 705/14.42 |
| 2011/0307432 | A1* | 12/2011 | Yao ................... G06F 17/30864 706/25 |
| 2012/0072407 | A1 | 3/2012 | Shyamsunder et al. |
| 2012/0158747 | A1* | 6/2012 | Satow ............... G06F 17/30864 707/748 |
| 2013/0173701 | A1* | 7/2013 | Goyal .................. H04L 61/302 709/204 |

OTHER PUBLICATIONS

GHG Internet Services, "Domain Name Registration Information", pp. 1 and 2.
WiredAlumni, 2000.
Internet Practice Solutions—Domain Registration Services [Online], Apr. 4th, 2001.
DomainNICnames home page, Jul. 23, 2002.
The Domain Name Exchange, http://www.web.archive.org/web/20001019034237/http://afternic.com, Oct. 19, 2000.
The Domain Name Exchange, http://www.web.archive.org/web/19991127181836/http://afternic.com, Nov. 27, 1999.
"Domain Name Search." Jan. 31, 2001. www.domainsearch.com.
Operating Firewalls Outside the LAN Perimeter, IEEE, 1999, pp. 493-498.
DMS Service Management, MILCOM 1994, Conf. Record, IEEE, vol. 3, pp. 967-971.
Lowensohn, Domain Pigeon now finds open Twitter Names, Apr. 9, 2009.
Staking a claim in cyberspace: [ONT Edition], Rider, David. Toronto Star [Toronto, Ont] Aug. 18, 2007: L 12. Downloaded from ProQuestDirect on the Internet on Mar. 11, 2013, 2 pages.
GoDaddy.com(R) Scores Stunning Super Bowl XL(R) Victory. PR Newswire [New York] Feb. 7, 2006: Downloaded from ProQuestDirect on the Internet on Mar. 11, 2013, 2 pages.
Matt Mazur, CNET!—Let's see what happens (Domain Pigeon), Apr. 9, 2009.
GoDaddy.com screen shot, http://web.archive.org/web/20030401091726/www.godaddy.com/gdshop/default.asp?e=com.
www.GoDaddy.com screen shot, Dec. 6, 2002.
Sedo to host "Around the world in seven days" online Auction, PR Newswire, Europe Including UK, Feb. 11, 2008, downloaded from ProQuestDirect on the Internet on Mar. 11, 2013, 2 pages.
A Major Domain to be Sold at Auction on Oct. 30—WebChat. com—Offers Premium Web Presence and Growth Opportunity in the Booming Online and Mobile Communications Industry. Anonymous. Oct. 10, 2008.
InterNIC, "InterNIC FAQs on the Domain Names, Registrars, and Registration." Sep. 25, 2003. http://www.internic.netlindex.html.

\* cited by examiner

SYSTEM AND METHOD FOR DOMAIN NAME QUERY METRICS

FIELD OF THE INVENTION

The present invention relates generally to domain name registration and, more particularly, to systems and methods for providing users an assessment tool for determining the level of demand for domain names.

BACKGROUND OF THE INVENTION

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as web pages. Websites comprise a collection of connected, or otherwise related, web pages. The combination of all the websites and their corresponding web pages on the Internet is generally known as the World Wide Web (WWW) or simply the Web.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Websites may consist of a single webpage, but typically consist of multiple interconnected and related web pages. Websites, unless extremely large and complex or exposed to unusual traffic demands, typically reside on a single server and are prepared and maintained by a single individual or entity. Menus and links may be used to move between different web pages within the website or to move to a different website as is known in the art. The interconnectivity of web pages enabled by the Internet can make it difficult for Internet users to tell where one website ends and another begins.

Websites may be created using HyperText Markup Language (HTML) to generate a standard set of tags that define how the web pages for the website are to be displayed. Users of the Internet may access content providers' websites using software known as an Internet browser, such as MICROSOFT INTERNET EXPLORER or MOZILLA FIREFOX. After the browser has located the desired webpage, the browser requests and receives information from the webpage, typically in the form of an HTML document, and then displays the webpage content for the user. The user then may view other web pages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

In most cases, the user searching for a domain name is only provided with information on the webpage of whether the domain name is available or not. In some cases, the webpage will provide the user with alternative domain name options if the desired domain name is already registered.

DETAILED DESCRIPTION

Figure 1:
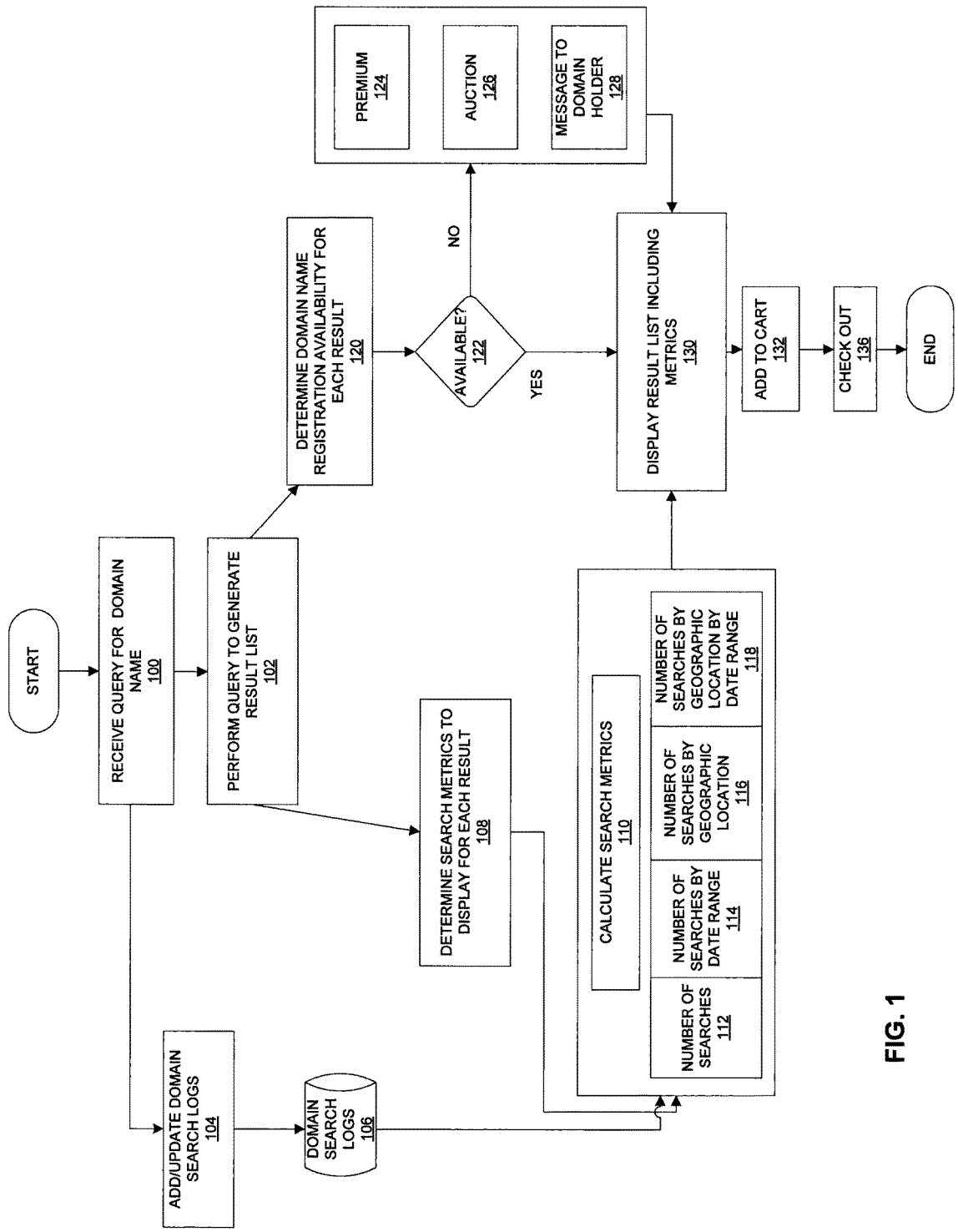
FIG. 1 is a flowchart illustrating a method by which a registrar can receive a domain name query request from a user and then display a listing of results in response to the request.

The present invention relates generally to domain name registration and, more particularly, to systems and methods for providing users an assessment tool for determining the level of demand for domain names.

In one implementation, the present disclosure provides a method including the steps of receiving, by a server communicatively coupled to a network, a request from a requester. Using the request to identify a domain name and determining whether the domain name is registered. When the domain name is not registered, a search metric for the domain name is determined and a first user interface listing the domain name and the search metric is displayed. The first user interface enables the requester to purchase the domain name.

In another implementation, the present disclosure provides a method including the steps of receiving, by a server communicatively coupled to a network, a request for a domain name by a requester and determining whether the domain name is registered. When the domain name is registered a search history for the domain name to determine a first search metric is analyzed, and a first user interface is displayed listing the domain name and the first search metric. The first user interface enables the requester to participate in at least one of an auction process and a brokerage process to purchase the domain name. When the domain name is not registered, a search history for the domain name to determine a second search metric, which is different from the first search metric, is analyzed. A second user interface is displayed listing the domain name and the second search metric enabling the requester to purchase the domain name.

In another implementation, the present disclosure provides a system including at least one server communicatively coupled to a network configured to receive a request from a requester. A domain name is identified by the request. The at least one server identifies the domain name as registered or not registered. When the domain name is not registered, the system includes a search metric determined for the domain name and a first user interface configured to display the domain name and the search metric. The first user interface enables the requester to purchase the domain name.

In another implementation, the present disclosure provides a system including at least one server communicatively coupled to a network configured to receive a request for a domain name by a requester. The domain name is identified by the at least one server as registered or not registered. When the domain name is registered, the system includes a search history for the domain name to determine a first search metric, and a first user interface configured to display the domain name and the first search metric. The first user interface enables the requester to participate in at least one of an auction process and a brokerage process to purchase the domain name. When the domain name is not registered, the system includes a search history for the domain name to determine a second search metric, the second search metric being different from the first search metric. A second user interface is configured to display the domain name and the second search metric, the second user interface enables the requester to purchase the domain name.

To acquire a domain name a user will often perform a search for a candidate domain name at a registrar's domain name registration website. The user can enter either a desired domain name or a number of search terms, which may be provided as text or any other input into the domain name registration website, and perform a query. In response to the query, the user will be presented with one or more candidate domain names that are relevant to the query.

FIG. 1 is a flowchart illustrating a method by which a registrar and, specifically, a web site operated by the registrar, can receive a domain name query request from a user and then display a listing of results in response to the request. Depending upon the status of the domain names returned in response to the user's query (e.g., registered or unregistered) the user may be presented with several search metrics for the domain names in the result listing. For example, if a particular domain name is available, the metrics displayed may include the probability that the domain name will be purchased within a date range and/or within a specified geographic location. The user may then have an option to purchase the domain name.

As a non-limiting example, the method illustrated in FIG. 1 (and all methods described herein) may be performed by any central processing unit (CPU) in any computing system, such as a microprocessor running on a server, and executing instructions stored (perhaps as scripts and/or software) in computer-readable media accessible to the CPU, such as a hard disk drive on a server. Such a server may be communicatively coupled to a network (e.g., the Internet) and may receive a request for a domain name (e.g., in accordance with step 100 of FIG. 1) using that network. The server may be implemented as a singular computing device operating a number of CPUs or as a distributed computing system wherein different portions of the method may be distributed across different computer servers that are each in communication with one another over a computer network.

Prior to performing the method shown in FIG. 1, the registrar's domain name registration website may perform actions to prepare data sets or data collections that are utilized to perform the method of FIG. 1. For example, the server hosting the domain name registration website may maintain a set of domain search logs 106 describing prior search activity on the domain name registration website. As a non-limiting example, the set of domain search logs 106 may be provided by any open source software (e.g., Apache Hadoop) capable of processing large datasets to generate data to be stored in a historical database. The domain search logs 106 may record information describing domain name searches performed by all users requesting or searching for candidate domain names using the domain name registrar's website. The information stored in the domain search logs 106 may include, for example, for each search executed, the search terms, number of results, the user's identifying information, the user's location, such as country or region, which may be derived from the user's IP address using geolocation software, the time and date on which a search occurred, the user's language and language preference (e.g., derived from the language settings of the user's browser), the type of computing device and browser executing the search, the status of the user requesting the search as a customer or non-customer of the registrar, the user's time zone.

With access to the domain search logs 106, the server hosting the domain name registration website can process the data in the domain search logs 106 to generate a plurality of search metrics based upon the search query provided by the user at step 100. The metrics can then be displayed to the user to enable the user to understand in more detail the market for the domain names in which the user is interested. The search metrics, for example the total number of searches for a specific domain name, may be calculated in real time. The probability that the domain name will be purchased within a date range and/or within a specified geographic location, however, may be pre-calculated using a continuously improving engine used to update statistics. The domain search logs 106 may then be grouped by user location and country once a match is found for a requested domain name within a certain time period. The metrics are described in the further detail below.

Referring to FIG. 1, in step 100, a request including a domain name query is received via a suitable user interface. The request may come from any individual or entity having access to the network that may wish to research potential domain names for registration and may comprise any electronic request received by the server including, but not limited to, a Hyper Text Transfer Protocol (HTTP) request, email message, and/or Short Message Service (SMS) message (i.e., text message). The request may comprise any combination of data seeking information relating to a domain name, such as the name of a domain name or keywords or other data that may relate to a potential domain name or that can be analyzed to identify one or more domain names relevant to the query. As non-limiting examples, the request may comprise an HTTP request transmitted to a domain name registrar's website.

Figure 2:
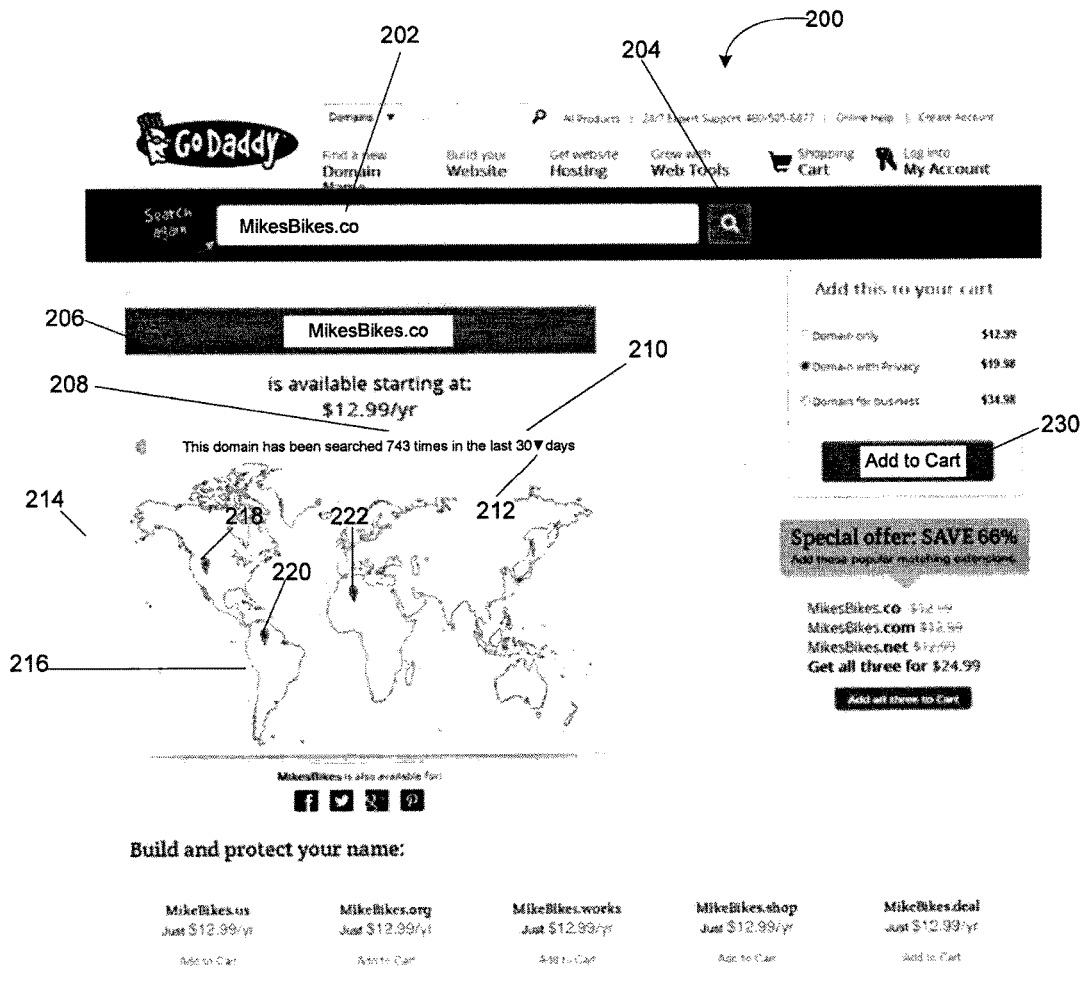
FIG. 2 is a screenshot showing an example user interface by which a requester can initiate a search for a domain name and view a result listing in accordance with present invention.

To illustrate, FIG. 2 is a screenshot showing an example user interface 200 by which a requester can initiate a search for a domain name in accordance with step 100 of FIG. 1. Referring to FIG. 2, the requester can enter the name of the desired domain (e.g., MikesBikes.com") or other search terms that may be related to a desired domain name into search box 202. Then, after the query has been entered into search box 202, the requester can activate button 204 to perform the query.

Returning to FIG. 1, once the request is received, the domain search logs 106 may be updated at step 104 with the data relevant to the query received in step 100. This may involve, for example, creating a new entry in the domain search logs 106 that contains information describing the search query received in step 100, such as the user's location, the time and date on which the search query was received, and the specific query terms searched. This data is stored in the domain search logs 106 for later use in calculating metrics. In other implementations, the search logs 106 are not updated until the method depicted in FIG. 1 has completed execution.

Having received the query in step 100, in step 102 the query is executed and a number of candidate domain names are generated in a result listing. If the query included a specific domain name, the result listing may include that specific domain name and, optionally, a number of alternative domain names. If, however, the query included a number of search terms (or other data), rather than a specific domain name, the result listing may contain a number of candidate domain names that are relevant to the query. In some implementations, the result list may include only a single candidate domain name.

Figure 3:
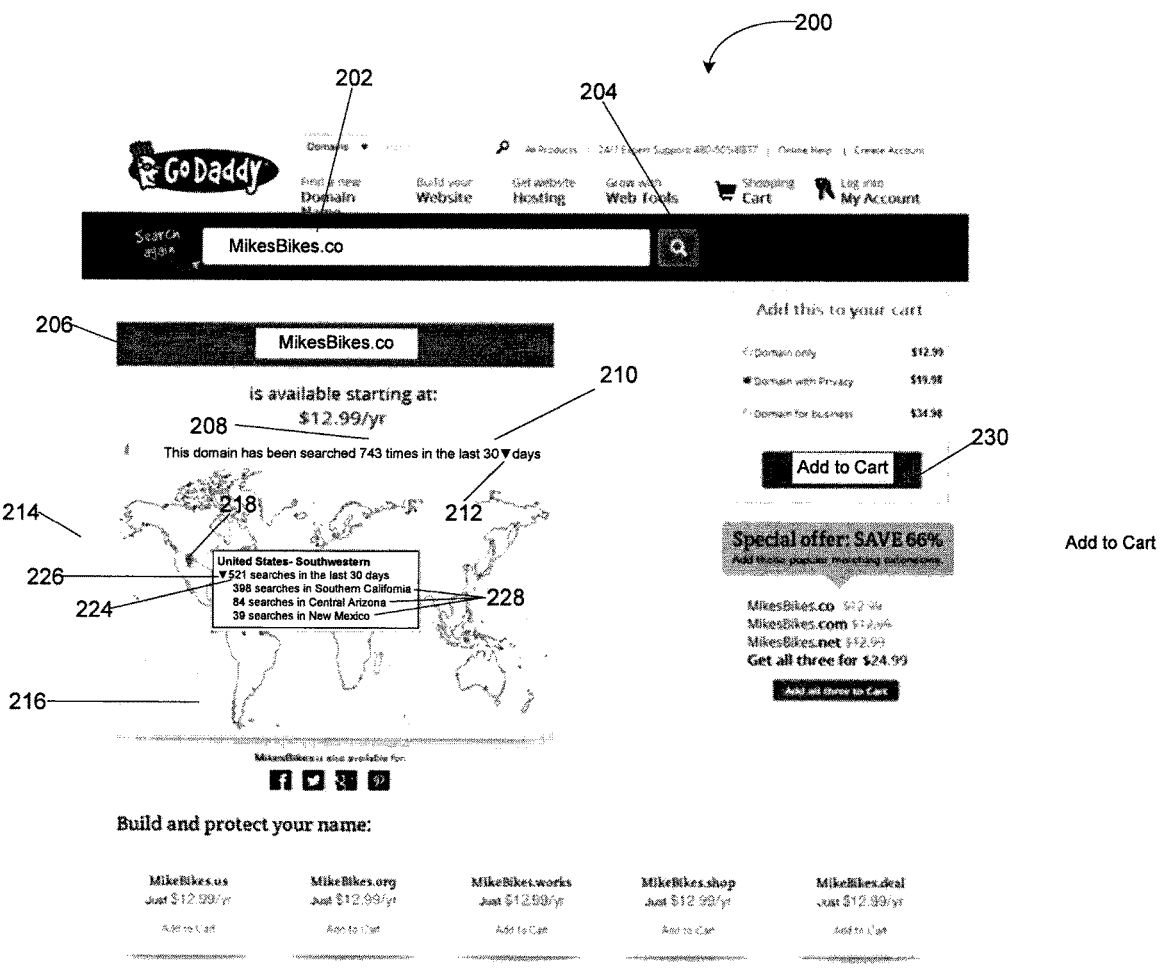
FIG. 3 is a screenshot showing the example user interface of FIG. 2 further including a plurality of search metrics on the user interface in the result listing in accordance with present invention.

Having generated a result list, metrics can be calculated for each domain name in the result list. Accordingly, in step 108, for each domain name in the result list, the server determines which search metrics to display. The determination of which metrics to display may be based upon a number of factors including the user's preferences, attributes of the query itself, or any other data accessible to the server. The metrics to be generated and displayed may also be determined by a status of the domain name. For example, if the domain name is already registered, a first set of metrics may be calculated, whereas if the domain name is not already registered a different set of metrics may be calculated. Potential metrics include but are not limited to, for example, the total number of requests for the domain name (e.g., MikesBikes.com) by all other requesters 112, the total number of requests for the domain name by other requesters within a specified date range 114 (e.g., the past 100 days, the past 2 months) as shown in FIG. 2, the total number of requests for the domain name by other requesters categorized by geographic location 116 (e.g., city, state, country, region) as shown in FIG. 3, and a total number of requests for the domain name by other requesters categorized by geographic location with a specified date range 118, as shown in FIG. 3. In these examples, the total number of requests for a domain name by other requesters may refer to the number of queries performed by other users or requesters that have specifically stated the domain name in question (e.g., query explicitly searching for "MikesBikes.com"), or the number of keyword queries that have generated result listings that have included the domain name in question (e.g., "Michael Bicycle Store").

After the metrics to be displayed have been determined, the server analyzes the data provided by the domain search logs 106 and calculates the relevant of search metrics at step 110.

Search metrics 112 and 116 may be pre-calculated values, allowing the plurality of search metrics to be displayed to the user at step 110 more quickly. Since the domain search logs 106 records all locations and the specific query terms searched for by all users using the domain name registrar's website, the domain search logs 106 may also store a running total of these values as new domain name queries occur. Therefore, the server may only need to calculate search metrics 114 and 118, for example, in real-time at step 108 depending on the date range and geographic location selected by the user on the domain registration website, thereby improving performance of the server.

In order to display the search metrics to the user, the server accesses the data recorded by the domain search logs 106. For example, to calculate the number of prior searches 112 at step 110, the server can access a table in the domain search logs 106 that contains a record for each time a query is made for a specific domain name or relevant keyword. The server may then generate a total value for the number of times the domain name has been queried and display it to the user.

To calculate the number of searches for a specific domain name in a date range 114, for example, the server accesses the domain search logs 106 containing a record and a date stamp for each query that has been made for the specific domain name or relevant keyword. The server can then generate from the date stamp information a total value for the number of times the domain name or relevant keyword has been queried during a specific date range (e.g., specified by the user) and display the result to the user at step 110.

Similarly, to calculate the number of searches for the specific domain name or relevant keyword by geographic location 116, the server can access the domain search logs 106. Then, based upon a geographical region that can be defined, for example, by the user, the server can identify the number of searches that has occurred in that region for the domain name or relevant keyword and display the result to the user at step 110. The geographical region can be defined in a number of different ways, for example, by the user clicking on a point on a map and providing a radius around that point to define a geographical region, the user can also specify political boundaries (e.g., of a city, county, or state) that can be used to defined the geographical region, and the like. Alternatively, the geographical region can be determined by the implicitly—for example, by being based upon the user's current location.

Likewise, to calculate the number of searches by geographic location within a date range 118, the server accesses the domain search logs 106 to determine the geographic location in which the specific domain name or keyword has been searched for by all other users, as well the date and time the queries were made. The server can then generate from these values a total value for the number of times the domain name or relevant keyword has been queried during the date range and geographic location specified by the user. The result can then be displayed at step 110.

In some implementations, the metrics associated with a particular domain name may also include the probability that the domain name will be purchased within a particular period of time. This probability may be calculated from the proprietary data and search metrics obtained from the domain search logs 106. More specifically, the following function may be used to calculate the probability that the domain name will be purchased within a particular time period in a specific geographic location:

P(domain name purchase in X days)=(Number of purchases when the total count was similar)/(total count of people that searched for the domain name)

For example, using the above function, if 80 users searched for the domain name 'mysmallbiz.com', and 60 people bought one of the suggested alternatives in a 7 day period, then the probability would be 60/80 or 75%. Similarly, if today, a user searched for the domain name 'allmymagic.com' and 62 results are shown (i.e., a range of 55 to 65 hits), the 75% probability may be used based on the result for 'mysmaillbiz.com'.

In some embodiments, other variables may be used, either singularly or in combination, when calculating the probability that the searched domain name will be purchased. These variables may include, but are not limited to the following: the number of total domain names sold relative to the number of domain names sold by GODADDY.COM in a specific region, the mention of the searched keyword in social media (e.g., Twitter, Facebook, etc.) in a specific timeframe, promotional offers offering discounted pricing on domain names, both by GODADDY.COM and competitors, introduction of new gTLDs in the domain market, renewals of similar sounding domain names, web pages actively hosted on the domains versus parked pages, and the existence of Facebook pages.

In step 120, for each of the candidate domain names in the result listing, the registration availability of each domain name is determined, perhaps by at least one server ascertaining whether the domain name (e.g., "MikesBikes.com") has already been registered by checking the SRS database associated with the TLD of the domain name (.com in the instant example). As an additional non-limiting example, any of the systems and/or methods may be used as described in U.S. Patent Application Publication No. 2004-0199520 entitled: "Method for Checking the Availability of a Domain Name," which is assigned to The Go Daddy Group, Inc. and incorporated herein by reference. Alternatively, any method of determining domain name registration availability known in the art or developed in the future may be used. In some implementations, the registration status of a particular domain name may be a factor in determining which metrics are to be displayed for the domain name in a result listing. As such, step 120 can be, in some implementations, performed before step 108 enabling the registration status of the domain name to be a factor in determining which metrics to display.

Figure 4:
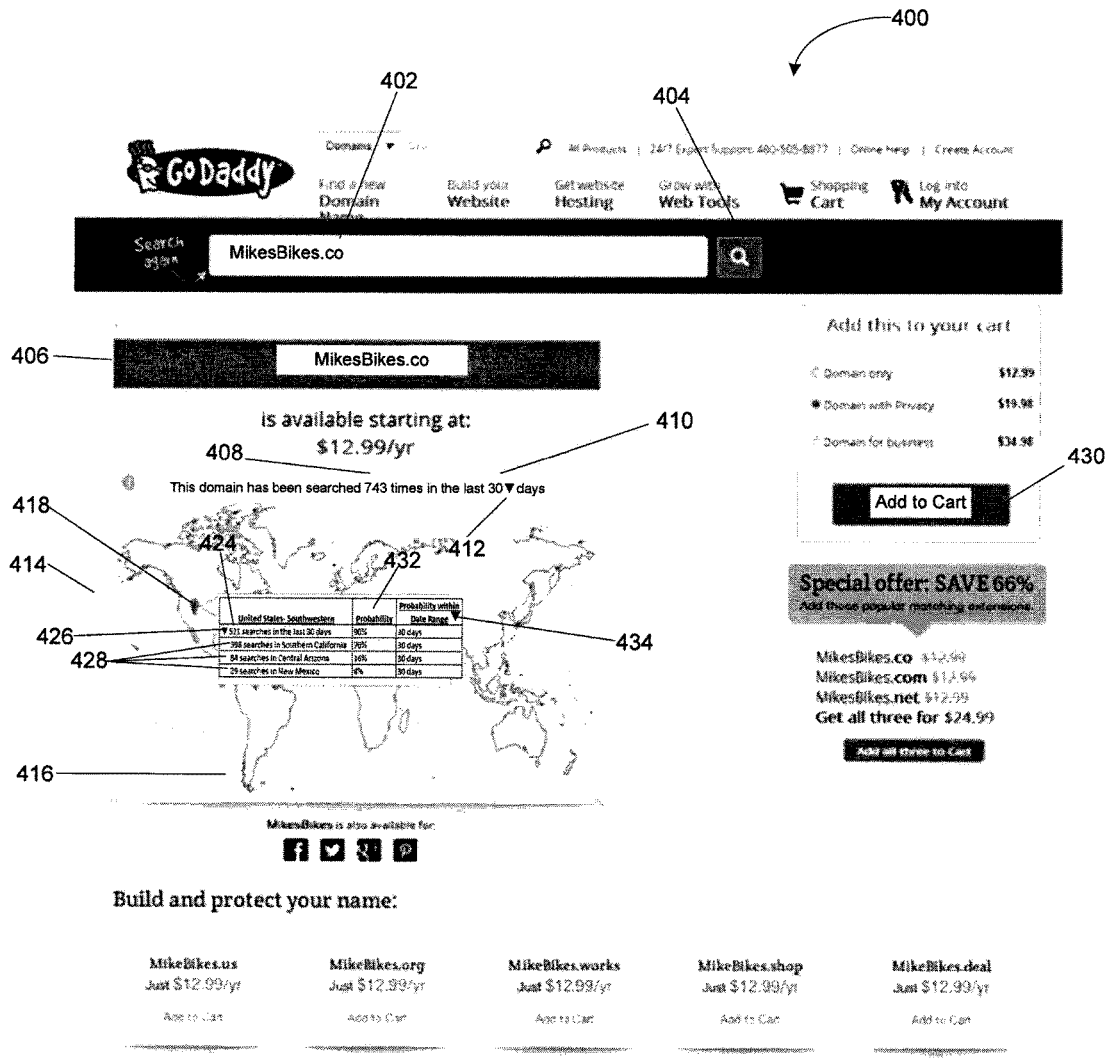
FIG. 4 is a screenshot showing the example user interface of FIG. 2 further including additional search metrics on the user interface in the result listing in accordance with present invention.

If, in step 122 the domain name is determined to be available for registration, the domain name is displayed to the user in step 130 along with the metrics that were calculated for the domain name in step 110 as well as an option to purchase the domain name. For example, FIG. 2 shows a domain name ("MikesBikes.co") that is available for registration along with metrics showing how many times that domain name has been searched for in the last 30 days. FIG. 3 shows a domain name ("MikesBikes.co") that is available for registration along with metrics showing how many times the domain name has been searched for in the last 30 days along with a map depicting geographically-restricted metrics for the domain name. FIG. 4 shows a domain name ("MikesBikes.co") that is available for registration along with metrics showing how many times the domain name has been searched for in the last 30 days along with a map depicting geographically and time-restricted metrics for the domain name. In step 130 any additional metrics calculated in step 110 may also be displayed along with the domain name, such as the calculated probability of the domain name being purchased by another requester within a specified time frame, as shown in FIG. 4. By displaying to the user the probability that the requested domain name within a geographical location or in general will be purchased by another requester may give the requester a sense of urgency and enable them to purchase the requested domain name before the domain name is purchased by another.

The domain name then may be provided for registration and the user may add the domain name to their cart at step 132 by pressing the button 230, as shown in FIG. 2. This step may be accomplished by any method of informing a potential registrant that a domain name may be available for registration. As a non-limiting example, where a request for a domain name is received (step 100) via an electronic request (e.g., HTTP request, email message, SMS message, text message), the domain name may be provided for registration via similar electronic communication means, perhaps via a server. Thus, an HTTP domain name request may be responded to with an HTTP response that provides a webpage listing the domain name for registration, perhaps as a hyperlink. If the potential registrant clicks on the domain name, the potential registrant may be taken to a domain name registration website to check out at step 136, as shown in FIG. 1.

Domain name registration may be accomplished by any domain name registration method known in the art or developed in the future, perhaps via a website-enabled domain name purchase and registration system, such as that described in detail above and/or may be available on GODADDY.COM's website. Alternatively, domain name registration may be accomplished via human to human communication, perhaps via a telephone call or in-person meeting. Domain names may be registered by, as non-limiting examples, any individual or entity including, but not limited to a domain name registry, domain name registrar, hosting provider, and/or software application developer or distributor.

Returning to step 122, if the domain name is not available for registration (e.g., the domain name has already been registered by another), in steps 124, 126 and 128 additional options can be displayed for the user to either purchase the domain name at a premium, purchase the domain name via a domain name auction service, such as GODADDY.COM's GODADDY AUCTIONS service, or send a message to the domain name holder to make an offer to purchase the domain name via a brokerage process, respectively. These options can then be displayed for the user in conjunction with step 130 along with the metrics that are relevant to the domain name. Alternatively, if the domain name searched for by the current user was previously purchased by a GODADDY.COM customer and has a parked page, an interest icon (not shown) may be clicked by the current user to contact the owner of the domain name through GODADDY.COM. If the user decides to purchase the domain name via one of the mechanisms provided via steps 124, 126 and/or 128, the user may add the domain name to their cart at step 132 by pressing button 230, as shown in FIG. 2. The user may then click on the domain name to be purchased and may be taken to the domain name registration website to check out at step 136, as shown in FIG. 1.

Referring back to FIG. 2, a screen shot of an exemplary domain registration website 200 that depicts metrics associated with the domain names that make up a result listing in response to a user's query is shown. The user may begin by typing in the search box 202 a desired domain name (e.g., MikesBikes.com) or a series of search terms and clicking on button 204 to obtain a result listing 206. The exemplary result listing 206 shown in FIG. 2 includes several of the search metrics generated from the domain search logs, previously described. For example, a total number of requests 208 for the domain name searched by the user within a specified time period 210 is displayed. A drop down menu 212 is available to the user on the user interface 214 to change the time period 210 for which the metrics are applicable. In a non-limiting example, the time period 210 may be a number of minutes, a number of days, a number of months, or a number of years. A map 216 may also be displayed to the requester of the domain name to indicate regions 218, 220, 222 of a geographical area in which searches for the domain name (or similar query terms) are most prevalent.

The user may further manipulate the user interface 214 by clicking on one of the regions 218, 220, 222 to obtain additional search metrics related to their domain name search, as shown in FIG. 3. In a non-limiting example, the user may click on the Southwestern U.S. region 218, however the user is not limited to clicking on different regions on the map 216, but may also click different cities, states and countries, for example. Once the user clicks on the Southwestern U.S. region 218, for example, a total number of requests for the domain name searched by other requesters categorized by geographic location 224 (i.e., Southwestern U.S), as well as a total number of requests for the domain name by other requesters categorized by geographic location within the specified time period 210 is displayed. An expansion button 226 may be clicked by the user to see a break down of the number of searches within the region 218 (i.e., Southwestern U.S.) by a list of areas 228 (e.g., Southern California, Central Arizona, and New Mexico) within the region 218. For example, there have been 398 requests for the domain name "MikesBikes.com" in Southern California in the past 30 days, as shown in FIG. 3. As described above, the user may click on the drop down menu 212 to change the time period 210. At this point, the user may click button 230 to add the available domain name to their cart for purchase.

In another implementation, as shown in FIG. 4, a screen shot of an exemplary domain registration website 400 that provides to the user the probability of a domain name being sold to another requester is shown. The user may begin by typing in the search box 402 a desired domain name (e.g., MikesBikes.com) and clicking on button 404 to obtain a result listing 406. The exemplary result listing 406 shown in FIG. 4 includes several of the search metrics generated from the domain search logs, previously described. For example, a total number of requests 408 for the domain name searched by the user within a specified time period 410 is displayed. Advantageously, a drop down menu 412 is available to the user on the user interface 414 to change the time period 410. In a non-limiting example, the time period 410 may the number of minutes, the number of days, the number of months, or the number of years. A map 416 may also be displayed to the requester of the domain name to indicate regions 418 that the domain name is most prevalently searched.

The user may further manipulate the user interface 414 by clicking the region 418 to obtain more search metrics related to their domain name search, as shown in FIG. 4. In a non-limiting example, the user may click on the Southwestern U.S. region 418, however the user is not limited to clicking on different regions on the map 416, but may also click different cities, states and countries, for example. Once the user clicks on the Southwestern U.S. region 418, for example, a total number of requests for the domain name searched by other requesters categorized by geographic location 424 (i.e., Southwestern U.S), as well as a total number of requests for the domain name by other requesters categorized by geographic location within the specified time period 410 is displayed.

An expansion button 426 may be clicked by the user to see a break down of the number of searches within the region 418 (i.e., Southwestern U.S.) by a list of areas 428 (e.g., Southern California, Central Arizona, and New Mexico) within the region 418. As described above, the user may click on the drop down menu 412 to change the time period 410. In addition, a probability 432 that the searched domain name will be sold within the time period 410 in both the region 418 and the list of areas 428 within the region 418 is displayed.

A second drop down menu 434 may be available for the requester to specify a time period in which the probability 432 of the domain name being purchased by another requester is in. For example, as shown in FIG. 4, the probability that the domain name "MikesBikes.com" will be purchased by another requestor in Southern California within the next 30 days is 76%. However, a user may want to know what the probability 432 of the domain name being purchased by another requester is within the next 10 days. In this case, the user may click on the second drop down menu 434 do specify this time period. By displaying the probability 432 to the user, a sense of urgency and knowledge of demand for the domain name may be developed, enabling the user to purchase the domain name. At this point, the user may click a button 430 to add the available domain name to their cart for purchase.

Figure 5:
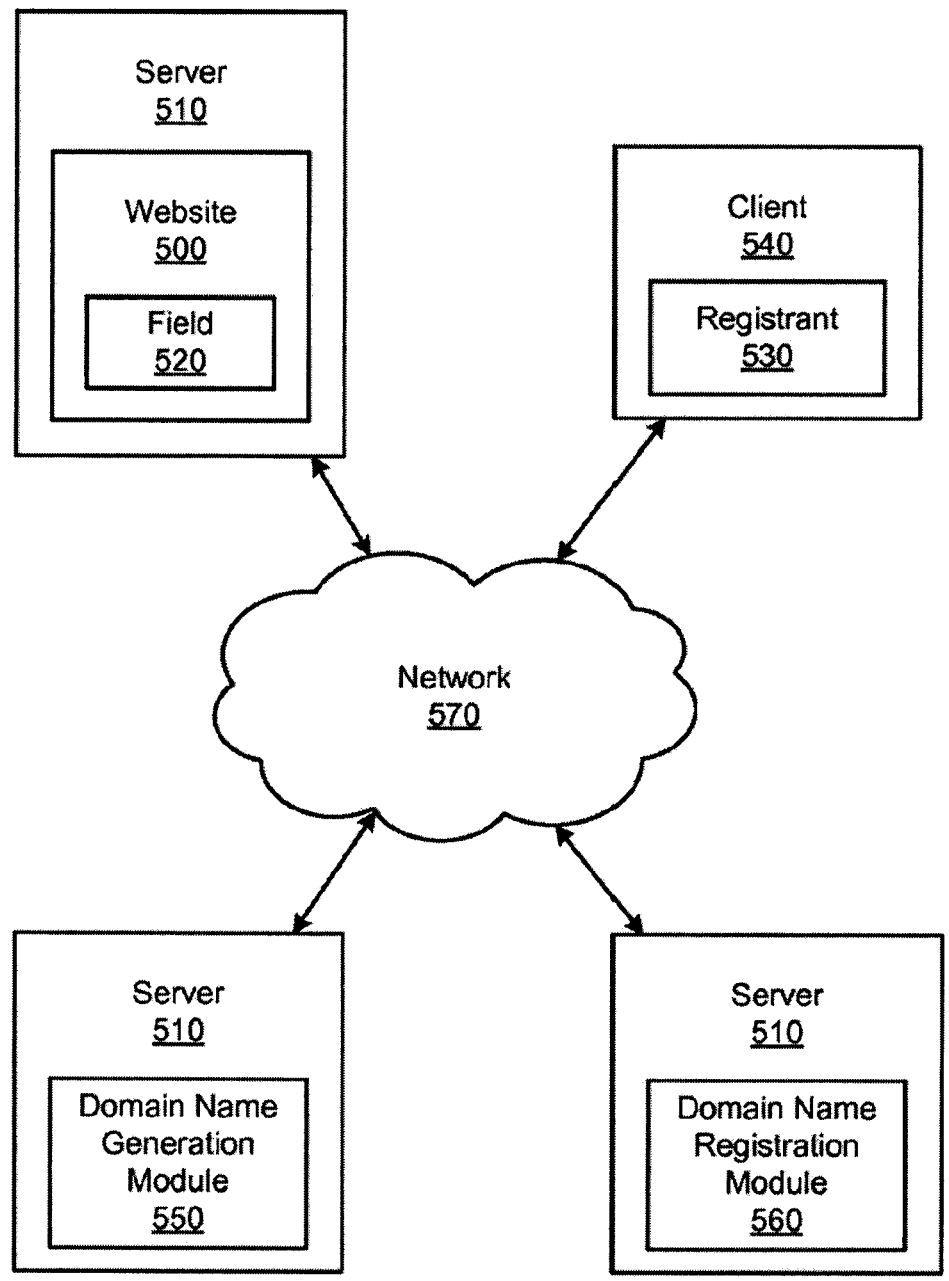
FIG. 5 illustrates a possible embodiment of a system for generating the probability a queried domain name will be purchased.

FIG. 5 illustrates a possible embodiment of a system for generating domain names and the probability that the queried domain name will be purchased. This example embodiment may comprise a website 500 hosted on at least one server 510 communicatively coupled to a network 570. The network 570 may communicatively couple servers 510 to at least one client 540, which may be accessed by a potential domain name registrant 530. The example embodiments herein place no limitation on network 570 configuration or connectivity. Thus, as non-limiting examples, the network 570 could comprise the Internet, the public switched telephone network, the global Telex network, computer networks (e.g., an intranet, an extranet, a local-area network, or a wide-area network), wired networks, wireless networks, or any combination thereof. Examples of clients 540 that may be used may include a desktop computer, a laptop computer, a hand held computer, a terminal, a television, a television set top box, a cellular phone, a wireless phone, a wireless handheld device, an Internet access device, a rich client, thin client, or any other client functional with a client/server computing architecture.

Servers 510 and clients 540 may be communicatively coupled to the network 570 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (Ti, Frame Relay), Point-to-Point Protocol over Ethernet (PPPoE), and/or any combination thereof.

The website 500 may comprise any collection of data and/or files accessible via a browser on a client 540 having access to a network 570 communicatively coupled to the server 510. The at least one server 510 and/or any other server described herein, could be any computer or program that provides services to other computers, programs, or users either in the same computer or over a computer network. As non-limiting examples, the at least one server 510 could be an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

The website 500 may have one or more fields 520 for submitting a request for an available domain name. The fields 520 on the website 500 may comprise a button on a webpage allowing a registrant 530 (or other user) to request the probability a domain name will be sold, perhaps by clicking a button entitled "Generate probability domain name will be sold". The website 500 may be configured to send an HTTP request for the domain name when the button is clicked. As a non-limiting alternative, the field 520 may comprise a dropdown menu that presents the registrant 530 with a plurality of options from which to select, including geographic locations and date ranges. The field 520 may comprise any means for generating a probability that a domain name will be sold within a specified date range. As non-limiting examples, the field 520 may comprise means for generating and sending an email message, SMS message, and/or other text message, such as email and/or SMS software.

The system also may comprise a domain name registration module 560 running on at least one server 510 and offering the generated domain name for registration (if available). This module may comprise software and/or scripts containing instructions that, when executed by the server's 510 microprocessor, cause the microprocessor to determine whether the domain name is available for registration (Step 120) and provide the domain name for registration, if available (Step 128). Additionally, the domain name registration module 560 may, if the domain name is available, register the domain name to the registrant 530. It may comprise any domain name registration system known in the art or developed in the future including, but not limited to, a website enabled domain name purchase and registration system, such as that described in detail above and/or may be available on GODADDY.COM's website. The domain names database may comprise, as non-limiting examples, a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, or other means of data storage located on a computer, client, server, or any other storage device known in the art or developed in the future.

In the present disclosure, purchasing a domain name may refer to entering into a lease for a domain name in exchange for payment. The payment may consist of a monetary amount or any other exchange of value, such as the provision of services or exchange of domain name leases. The lease may be made for a domain name that had not been previously registered. For domain names that have been previously registered, the purchase may involve the creation of a new lease for the domain name, or the undertaking of a remaining portion of an existing lease. As such, the purchase (and corresponding change of ownership of a domain name) may involve a change of ownership of an existing lease, or the cancellation of the previous owner's existing lease for the domain name and the creation of a new lease for the new owner.

As a non-limiting example, the steps described above (and all methods described herein) may be performed by any central processing unit (CPU) or processor in any computer or computing system, such as a microprocessor running on a server computer, and executing instructions stored (perhaps as applications, scripts, apps, and/or other software) in computer-readable media accessible to the CPU or processor, such as a hard disk drive on a server computer, which may be communicatively coupled to a network (including the Internet). Such software may include server-side software, client-side software, browser-implemented software (e.g., a browser plugin), and other software configurations.

The present disclosure describes preferred embodiments with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included are generally set forth as logical flow-chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present invention has been described in terms of one or more preferred embodiments, and it should be appreciated that many equivalents, alternatives, variations, and modifications, aside from those expressly stated, are possible and within the scope of the invention.

The invention claimed is:

1. A method, comprising:
updating domain search logs stored in a historical database, wherein the domain search logs comprise information describing a plurality of users and a plurality of domain name searches entered by the plurality of users using a domain name registrar's website to request or search for candidate domain names;
receiving, by at least one server communicatively coupled to a network, a request for a domain name by a requester using the domain name registrar's website;
determining whether the domain name is registered or not registered; and
upon determining the domain name is registered:
  accessing the domain search logs to generate a plurality of search metrics based upon the information describing the plurality of users and the plurality of domain name searches entered by the plurality of users using the domain name registrar's website to request or search for candidate domain names,
  determining a first search metric in the plurality of search metrics to display, wherein the first search metric comprises a total number of requests for the domain name by other requesters, and
  displaying a first user interface listing the domain name and the first search metric, the first user interface enabling the requester to participate in at least one of an auction process and a brokerage process to purchase the domain name.

2. The method of claim 1, wherein the total number of requests for the domain name by other requesters is categorized by geographic location.

3. The method of claim 1, wherein the total number of requests for the domain name by other requesters is restricted to a first date range.

4. A method, comprising:
updating domain search logs stored in a historical database, wherein the domain search logs comprise information describing a plurality of users and a plurality of domain name searches entered by the plurality of users using a domain name registrar's website to request or search for candidate domain names;
receiving, by at least one server communicatively coupled to a network, a request for a domain name by a requester;
determining whether the domain name is registered or not registered; and
upon determining the domain name is not registered:
  accessing the domain search logs to generate a plurality of search metrics based upon the information describing the plurality of users and the plurality of domain name searches entered by the plurality of users using the domain name registrar's website to request or search for candidate domain names,
  determining a second search metric in the plurality of metrics to display, wherein the second search metric comprises a probability that the domain name will be purchased within a date range, and
  displaying a second user interface listing the domain name and the second search metric, the second user interface enabling the requester to purchase the domain name.

5. A system, comprising:
at least one server communicatively coupled to a network, the at least one server being configured to:
  update domain search logs stored in a historical database, wherein the domain search logs comprise information describing a plurality of users and a plurality of domain name searches entered by the plurality of users using a domain name registrar's website to request or search for candidate domain names;
  receive a request from a requester using the network;
  use the request to identify a domain name;
  determine whether the domain name is registered or not registered;
  upon a determination that the domain name is not registered, the at least one server being configured to:
    access the domain search logs to generate the plurality of search metrics based upon the information describing the plurality of users and the plurality of domain name searches entered by the plurality of users using the domain name registrar's website to request or search for candidate domain names,
    determine a second search metric in the plurality of metrics to display, wherein the second search metric comprises a total number of requests for the domain name by other requesters, and
    display, using the network, a second user interface configured to display the domain name and the second search metric, the second user interface enabling the requester to purchase the domain name.

6. The system of claim 5, wherein the total number of requests for the domain name by other requesters is categorized by geographic location.

7. The system of claim 5, wherein the second search metric includes a probability that the domain name will be purchased within a date range.

8. The method of claim 4, wherein the probability that the domain name will be purchased is restricted to a first geographic region.

* * * * *